A. G. DAY.
Hard Rubber.
No. 620. Reissued Nov. 9, 1858.
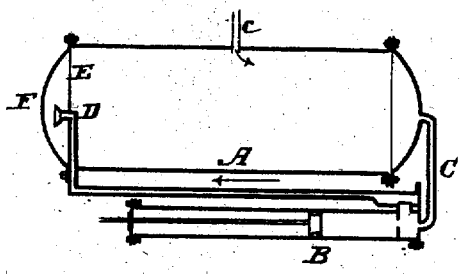
Witnesses.
T. F. Bucher
W. H. Wright man
Inventor.
Austin G. Day

UNITED STATES PATENT OFFICE.

AUSTIN G. DAY, OF SEYMOUR, CONNECTICUT.

IMPROVEMENT IN TREATMENT OF CAOUTCHOUC.

Specification forming part of Letters Patent No. 21,122, dated August 10, 1858; Reissue No. 620, dated November 9, 1858.

*To all whom it may concern:*

Be it known that I, AUSTIN G. DAY, of the town of Seymour, county of New Haven, State of Connecticut, have made or invented a new and Improved Method of Working what are usually denominated Hard-Rubber Compounds; and I hereby declare that the following is a full and exact description thereof.

The nature of my invention consists in a new method of treating sulphur and caoutchouc, or sulphur and any equivalent or vulcanizable gum, in order to make an artificial product having definite properties—namely, hardness, flexibility, indestructibility, and elasticity.

It is well known to the manufacturers of vulcanizable gums that Charles Goodyear, on the 15th June, 1844, patented a method of vulcanizing rubber to preserve it soft and flexible when exposed to the summer's sun or winter's cold or to the action of various solvents; and that Nelson Goodyear, in 1851, on the 6th May, patented a process of manufacturing what is usually called "hard-rubber compounds," but which is exactly defined by the patentee in his first claim, calling it a "hard and inflexible substance hitherto unknown." I call particular attention to this hard and inflexible compound, because in a reissue of the same patent on the 18th May, 1858, the character of inflexibility then recently discovered and claimed by the patentee and considered as its chief recommendation is hardly recognized in the reissued patent of 1858, but other and different features seem to have been set forth in a prominent light as the invention.

My invention consists in a special mode of making a hard but highly elastic gum compound by a process differing in the length of time, in the degree of heat, and in the proportion of the ingredients, and in the mode of equalizing the temperature from that described by Nelson Goodyear in his patent of 1851.

The reissue of 1858 having changed the original character of the product, the invention itself seems to be entirely lost sight of in the reissue. I am therefore compelled, in order to compare my present invention with that of Nelson Goodyear's of 1851 to refer to the original issue rather than to the reissue for that which the patent described as the invention. This being a definite and fixed product, endued with the property of inflexibility, could not be changed, however much the manner of describing it might vary; and while Charles Goodyear patented soft flexible vulcanized rubber product and Nelson Goodyear patented hard inflexible rubber products, I have discovered a hard but elastic and flexible product made by a certain specific process which I will describe. But before doing so, and in order that the art may be better understood and my experiment better appreciated, I will give a short statement of the general condition of the art up to about the time of my experiment, and then rehearse the substance of those experiments.

The design and scope of Charles Goodyear's experiments and results, patented June 15, 1844, consisted in devices for preserving the natural properties of caoutchouc and in adding thereto qualities of durability, so that it will withstand the test of time, heat, and cold, and also resist the action of the various-known solvents of rubber. These results have been set forth but imperfectly in what was called the "vulcanizing process." They were badly described because imperfectly understood. Thus the character and cause of what is denominated "efflorescence" in vulcanized goods was not known till announced by Payne, (Comptes Rendus, 29 March, 1852,) who has given a clear statement of the cause, showing that this effloresced sulphur had never been chemically combined with the vulcanizable gum, but only deposited in its pores and subsequently crystallized out by atmospheric and other changes. On the other hand, the sulphur which had been chemically combined, properly constituting the vulcanized gum, is incapable of effloresceing or separating from the gum. It is a new and comparatively stable sulphuret of caoutchouc, endowing the gum with entirely new properties. The manufacturers who were not aware of these facts mistook the effloresced sulphur as having arisen from using too much sulphur in the compound, began to diminish the proportion to obviate the evil, till the amount used was in some cases less than two per cent. of the mass, and no two manufacturers would be working with the same compound. Manufacturers were consequently working in the dark. Large amounts of goods were more or less damaged, sometimes from the proportions of the ingredients; sometimes from the impurities in the raw material, and sometimes from the defect in the curing process. Thus it has taken nearly the whole of the life-time of the patent to develop the process of manufacture. And although Charles Goodyear did commence with some degree of success the process of vulcanizing in 1841, and patented the same in 1844, yet so imperfectly was it understood at the time that even Charles Goodyear himself could scarcely repeat his own process twice with the same result; and manufacturers trying to use his process were, of course, in the same predicament. Sometimes the attempt to vulcanize would utterly fail without any apparent cause. Sometimes a specimen would be perfectly vulcanized in one part, and not at all in another part. Sometimes a thin piece would be cured too much and a thicker piece not cured at all. Sometimes goods on being removed from the heater would appear in good condition, but by a few weeks' or months' exposure they would be flabby or sticky. The smell and efflorescence of sulphur on the surface of the goods were strong objections made by the wearers of the manufacture, and it was naturally enough inferred by the manufacturers that too much sulphur had been used. Hence the efforts to avoid the evil by diminishing the quantity of sulphur in vulcanizing below that described in the patent; but it has been found after years of practice that the proportions prescribed in the patent were after all the best average for soft elastic rubber; and the manufacturers, instead of attempting to remove the so called "surplus sulphur," now known to be indispensable to successful vulcanization, diminished the amount of sulphur, using too small a proportion to vulcanize the goods, and thus vast sums were lost to the manufacturers by damaged goods thrown back on their hands. At length the evil was suspected, and they began to return to the prescription of the patent. The efflorescing surplus sulphur was removed by solvents which do not act on that which is chemically combined with the rubber. It is now known that the sulphur which effloresces from the goods was not chemically combined, but only deposited in the pores of the gum, and may be removed by solvents or expelled by properly running the heat used to vulcanize. Thus much for the soft vulcanized gum.

The same kind of uncertainty, though to a less extent, has attended the hard rubber manufacture patented by Nelson Goodyear in 1851. The working compound of the patentee was one part, by weight, of rubber, one-half part sulphur, and one-half part of some earthy oxide or base—as lead, lime, &c.—and the vulcanizing process was that claimed by Charles Goodyear in 1844 namely, heating the compound six hours, more or less, at a temperature varying from 260° to 275° Fahrenheit. The description and claim of a hard inflexible product sufficiently fixed the character of the invention, so that however the description might vary, the product must remain the same.

Besides the working compound described by Nelson Goodyear, he refers to a second compound, consisting of sulphur and rubber, of which he says in the specification: "When sulphur and rubber are used alone, equal parts, by weight, of each are necessary; indeed, a much less proportion of sulphur would not suffice." But as the last compound has never been used in practice, being found too brittle, and not being vulcanizable within the limits of Charles Goodyear's prescription for vulcanizing, it is disposed of without further remark.

I took up the hard-rubber manufacture at the time of the issue of the Nelson Goodyear patent of 1851, having a single object in view—namely, the manufacture of a hard elastic compound, in which I used with success both rubber and gutta-percha. I found, however, but one kind of rubber in the market that could be used with any certainty of success, and that was the best Para rubber. I soon learned that to produce a tough elastic product, I must abandon the Nelson Goodyear compound and confine my experiments to the use of sulphur and rubber, or sulphur and other gum. For though the earthy base increased the facility, shortened the time, and diminished the heat necessary for vulcanizing, in the same degree did it diminish the strength, flexibility and toughness of the article. But the prominent obstacle in the way of the manufacturer when I commenced my experiment, as I have since found, was that every kind of rubber in the market abounded in impurities which interfered with the vulcanizing process, so that fine Para was the only one I could use with any certainty of success. Even this, for the best manufactures, requires a thorough cleaning and drying. Besides, every degree of difference in impurity required a difference in the process used to vulcanize it. Again, it was almost impossible to produce a uniform vulcanization in all parts of the vulcanizing-charge. After working several years on the crude rubbers of commerce, and having devised several modes of separating the foreign matters from the pure gum in order to find a uniform article to work on, and as the preliminary step to the present invention, I perfected my process of cleaning crude rubber, and patented the same in June, 1856; for, although I succeeded occasionally in making fair specimens of hard elastic product in 1851–52, the results could not be relied on as certain. But by means of my cleaning process there have been introduced to the manufacturer some four or more different crude gums which previously no one was able to use, and, besides, some of these were hardly known to the public, at any rate not in quantities to supply manufacturers, and were only matters of curiosity. The process of cleaning opened the way for new articles of commerce and furnished the means to distinguish them from each other. By this purifying process I found the following five commercial articles to contain the following percentage of impurities, the same being an average of a large number of specimens tried:

First. Para rubber consists of three distinct qualities—fine, medium, and coarse. The fine contains eight to fifteen per cent. of moisture and dried sap, the medium, twenty per cent.; the coarse, thirty per cent., impurities. The fine Para is the standard of quality in the market.

Second. East India rubber embraces eleven or more different varieties belonging to as many different trees and vines, collected without regard to cleanliness or quality, filled with various foreign substances—as dried sap, sand, sticks, and bark—closely blended, and amounting to twenty per cent. It is softer than the Para rubber. A part of these varieties constitutes the bulk of the present market supply.

Third. Guayaquil rubber contains twenty-five to thirty-five per cent. of putrid sap, sand, sticks, &c. It is hard and not easily cleaned.

Fourth. Carthagena rubber is hard and tough, contains ten to fifteen per cent. of dried sap, &c., and is very hard to clean.

Fifth. African rubber contains twenty-five to forty per cent. of foreign matter, mostly an acrid sap. It is a soft and flabby article, and if the sap be retained on exposure to the atmosphere the gum is decomposed and spoiled. It comes from the west coast of Africa.

These several kinds I have noticed in the order of their quality in the market. They are here introduced because by my cleaning process they all are applicable to my vulcanizing process, and because they were not susceptible of such use before.

The knowledge of another peculiarity of crude rubber is very important to the manufacturer, growing out of its granular structure, the mass being made up of rounded granules, having intervening pores capable of absorbing and retaining moisture to the amount of eighteen or twenty-five per cent. of its weight. If this water be not removed before the attempt to manufacture the goods, it will be the means of damaging them, and has been the source, as I have known, of much evil to the business by deteriorating the product. The crude gum must be first purified to secure a uniformly good result.

Having cleaned either of the above crude gums in accordance with my process patented to me in 1856, I proceed to the second step in the process—namely, the mixing of the rubber and sulphur, in the proportions of sulphur used for each kind of rubber, as follows: Para, one pound rubber will take, say, eight ounces sulphur; East Indian and African, one pound will take, say, eight to ten ounces sulphur; Guayaquil or Carthagena, one pound will take, say, six to eighth ounces sulphur. The last two, being harder, require less, while the East Indian or African, being softer, may require more sulphur than the Para. The mixture is made in the usual way known to manufacturers.

A third obstacle in the manufacture of hard-rubber products respects vulcanizing thick pieces. In the manufacture of soft elastic rubber there is less difficulty in vulcanizing thick masses, on account of the porous or spongy condition of the vulcanized compound; but it is far otherwise with the hard-rubber compound, whether it be the flexible elastic or the inflexible variety patented by N. Goodyear. In the vulcanizing process, however performed, there is eliminated during the whole operation a constant discharge of sulphureted hydrogen and other sulphureted gases, which must have means of escape through the pores of the mass being vulcanized. The escape of these gases from soft elastic rubber is very easy; but from hard rubber or percha, whose pores on the surface portions are very close, it is difficult for them to escape. The consequence is that the mass is liable to be exploded from the increased pressure of the confined gases within the mass; hence the triple length of time required to vulcanize my composition and the greater heat to expel the gases. The explosion of the mass is accompanied by an instantaneous elevation of temperature and charring of the internal portions of the mass. It is also attended by greatly-increased internal pressure on the heater. From the great degree of compactness of this composition, where rubber and sulphur only compose it, great difficulty has been experienced in vulcanizing pieces of a half-inch to an inch in thickness; but by my present improved management of the heat in vulcanizing I am enabled to vulcanize pieces of an inch or more in thickness with great uniformity and perfection.

The fourth point of my improvement respects the length of time and the degree of heat necessary to give the required elasticity to the vulcanized compound. The time, the temperature, and the composition of matter, therefore, constitute the process. The mere fact of heating a vulcanizing compound a given length of time or at a given temperature without combining therewith the ingredients and the proportions would lead to nothing but confusion and error in the hands of the manufacturer. It is simply because time, heat, and composition of matter constitute the indispensable elements of the process. The time and heat used by the Goodyears are good enough for their composition, while it would be worthless for mine. Each of these elements must be adapted to, and, to a certain extent, controlled by, the others. If one be taken as the starting or fixed point, the others must conform—the product being the same in all cases here considered. Supposing six hours' heat be the starting-point, the composition in that case must be rubber, sulphur, and an earthy base; because sulphur and rubber alone could not be sufficiently vulcanized in that time, nor even in a much less time than twelve to eighteen hours, to produce the best hard elastic product. Again, suppose the time of vulcanizing be the fixed point and set at twelve to eighteen hours, the composition of rubber, sulphur, and earthy base, if used, would be overdone and worthless, while a rubber-and-sulphur, compound treated thus would be vulcanized to produce the most perfect result. Again, suppose the vulcanizing heat to be the fixed point, and set at 274° to 300°. The earthy base composition would be brittle and worthless even at the end of six hours, and nearly charred at an eighteen hours' heat, while my composition of gum and sulphur only would have an ivory hardness with the spring temper of steel. It is therefore clear that the elastic hard-gum compound cannot depend solely upon any single element of the combination, but on the mutual action of the three, no one of which by itself may be new. Thus Thomas Hancock heated his soft-rubber compound from 275° to 370°. Charles Goodyear says he runs his heat from 212° to 350°. The former continued his heat from one and a half to sixty minutes, and the latter three hundred and sixty minutes; but each used a different composition of matter, though they produced a similar result—that is, a vulcanized product. Again, in the Nelson Goodyear or hard-rubber patent the composition containing an earthy base combined with the sulphur and rubber, required but six hours to produce the hard-rubber compound, from the fact that the earthy oxide by its porousness facilitated the escape of sulphur gases, and thus very much shortened the period of vulcanization, but the product was at the same time destitute of flexibility and elasticity. In the present case, the composition being confined to rubber and sulphur without a third ingredient, and to a proportion neither used nor described by either of the Goodyear patents, and producing a result not known when these patents were issued, the combination is a legitimate one, it is new, and therefore patentable. The ingredients, being only rubber and sulphur, required about three times the length of time to vulcanize ever used before; and the result, as is evident from inspecting Nelson Goodyear's original patent of 1851, was not then alluded to by that patentee. To attain it with certainty and facility, as I am now able to do, cost me many years of labor and expense. As already stated, I commenced my labors with the vulcanizing process about the time of Nelson Goodyear's patent in 1851; but I soon learned that with my composition his time of heating and temperature were no guide for me, as I confined myself to the simple compound of rubber and sulphur, which I had done from the beginning. Nearly six years have been expended in efforts to perfect the process. The most formidable difficulty was the uncertainty of the expected result, which I often obtained and often failed in, but could not divine the cause of failure. This evil among manufacturers has been so great in some instances as to absorb the whole capital stock of a company—in the first place, from not knowing the difference between using the crude and the purified rubber; secondly, that the time and the temperature could not be easily adapted to work pure and impure rubber, as a different management was required for each degree of purity in the article used; and, thirdly, the want of means or ability to equalize the heat in every part of the charge during vulcanization.

My cleaning process, which had already taken more than two years to perfect, opened a new field of investigation, enabling me to use the poorest as well as the best article in the market, and always to have the certainty of a pure article to work upon. Therefore, it was not till the date of my cleaning patent of 1856 that I was prepared to settle upon the time and temperature necessary to successful vulcanization of my compound. The composition and kind of rubber having been selected, the time and the degree of heat adapted thereto for vulcanization will be seen by inspecting the tables below.

After suitably placing the several articles to be vulcanized within the heater, which consists of a strong iron cylinder resting on its side and calculated to resist a heavy pressure of steam within, the steam is let on and the heat run directly up to 275° Fahrenheit, and the process finished in from ten to twenty-four hours, as follows, (in the first case the articles are supposed to be about one-quarter of an inch in thickness and to require ten hours for vulcanization:)

First, the heat is run directly to 275° and allowed to stand four hours; then run to 280° for two hours; then run to 290° for two hours; then run to 295° for one hour; then run to 300° for one-half hour; then run to 305° for one-half hour.

Second, stock that is about five-eighths inch and requires for vulcanizing thirteen and one-half hours. The heating is commenced at 275° for six hours; then raised to 280° for three hours; then raised to 290° for two hours; then raised to 295° for two hours; then raised to 300° for one-half hour.

Third, vulcanization is more difficult with thick than with thin articles, from the fact already stated respecting the sulphureted gases escaping through the pores of the gum. Under these circumstances if the mass harden externally faster than internally the confined gases may explode the mass and spoil the form. Therefore the heat is continued a long time at 275°—thus, when the stock is five-eighths to one and one-half inches in thickness the heat is raised directly to 275° for six to twelve hours; then to 280° for four hours; then to 285° for four hours; then to 295° for four hours.

These tables are given merely to show the general range of time and heat.

I do not confine the heat to 300°, but I sometimes run it to 310° for the last hour but one, and to 315° or 320° for the last hour or the last half-hour. I also make various changes in the length of time and degree of heat at the different steps of the process below 300° to adapt the heat to different kinds of stock or different degrees of vulcanization as required for different articles of manufacture. I have also learned that the intervals or grades of heat will give a tolerable result by commencing the heat at the highest point of the scale and ending with that of the lowest, but using the same intervals as before. I have also tried a third plan, which consists in running the heat directly up to 295° or thereabout, and retaining it there for, say, twenty-four hours, or till the process be finished; but the result is not as good as when I commence at 275° or thereabout.

It has been found that with all the experience thus far obtained in the manufacture of hard-rubber and other gum compound, if vulcanization is performed in large heaters it is difficult, if not impracticable, to vulcanize equally in every part of the heater. Articles in one portion of the apparatus will be done too much or burned, while those of another part will be slack. These imperfections I have greatly obviated by establishing a circulation in the heater which equalizes the temperature in every part of it. This may be accomplished by means of a double-acting pump or a fan, or other equivalent device, which shall draw out the steam from one end of the cylinder and transfer the same into the head of the opposite end, as seen in the drawing, where A represents the heating cylinder supplied with steam for heating it up under pressure by the tube *c*. The articles to be vulcanized are placed within A. The circulation to equalize the temperature in all parts is made by working the pump B, or its equivalent, which draws the steam from the C end of the heater through valve *a* and forces it through valve *b*, and thence through pipe D, whence it strikes against head F and is distributed through the perforated plate E, and so through the body of the cylinder. It is evident that a single-acting pump, or a double-acting pump, or a rotary pump, or a forcing and exhausting fan, may be used for this purpose.

I do not now claim any special form of apparatus, for a variety of known apparatus might be used to accomplish the effect. Even a current of steam forced in at one end and out at the other would also aid in keeping up the circulation and tend to equalize the heat, but very imperfectly. The novelty consists in the making an artificial circulation in a vulcanizing apparatus irrespective of the special means so long as those means are mechanical.

I do not claim, in the broad, vulcanizing rubber or equivalent gums, irrespective of the special process used and product made; but

What I claim as my invention, and desire to secure by Letters Patent, is—

1. Running the heat for vulcanizing flexible and elastic hard gum compounds through the high range of temperature and the comparatively great length of time, substantially as set forth—that is to say, commencing the heat at about 275° and carrying the same to 300° and upward, substantially as described.

2. Making, as described, the flexible and elastic hard gum composition of two parts, by weight, of rubber or other vulcanizable gum and one part of sulphur, when such composition is preparatory to the running of the heat, as described in the specification.

3. Equalizing the temperature in the heating apparatus by mechanical means, substantially as set forth.

AUSTIN G. DAY.

Witnesses:
W. W. BOGARDUS,
E. R. BOGARDUS.